Aug. 27, 1940.   F. R. BICHOWSKY   2,212,852
REFRIGERATION
Original Filed Oct. 29, 1932   2 Sheets-Sheet 1

Inventor
Francis R. Bichowsky
By Spencer Hardman & John
Attorneys

Patented Aug. 27, 1940

2,212,852

UNITED STATES PATENT OFFICE 2,212,852

REFRIGERATION

Francis R. Bichowsky, Ann Arbor, Mich., assignor, by mesne assignments, to General Motors Corporation, a corporation of Delaware Application October 29, 1932, Serial No. 640,228
Renewed October 1, 1938

6 Claims. (Cl. 62—6)

This invention relates to refrigeration, heating and air conditioning.

It is among the objects of this invention to provide refrigerating, heating and air conditioning apparatus capable of maintaining the desired effective temperatures in dwellings, theatres and other places occupied by human beings, the operation of these apparatus being automatic in so far as controls are used for controlling part or all of the functions of the apparatus to maintain the air at the desired effective temperature.

Further objects and advantages of the present invention will be apparent from the following description, reference being had to the accompanying drawings, wherein a preferred form of the present invention is clearly shown.

Figure 2:
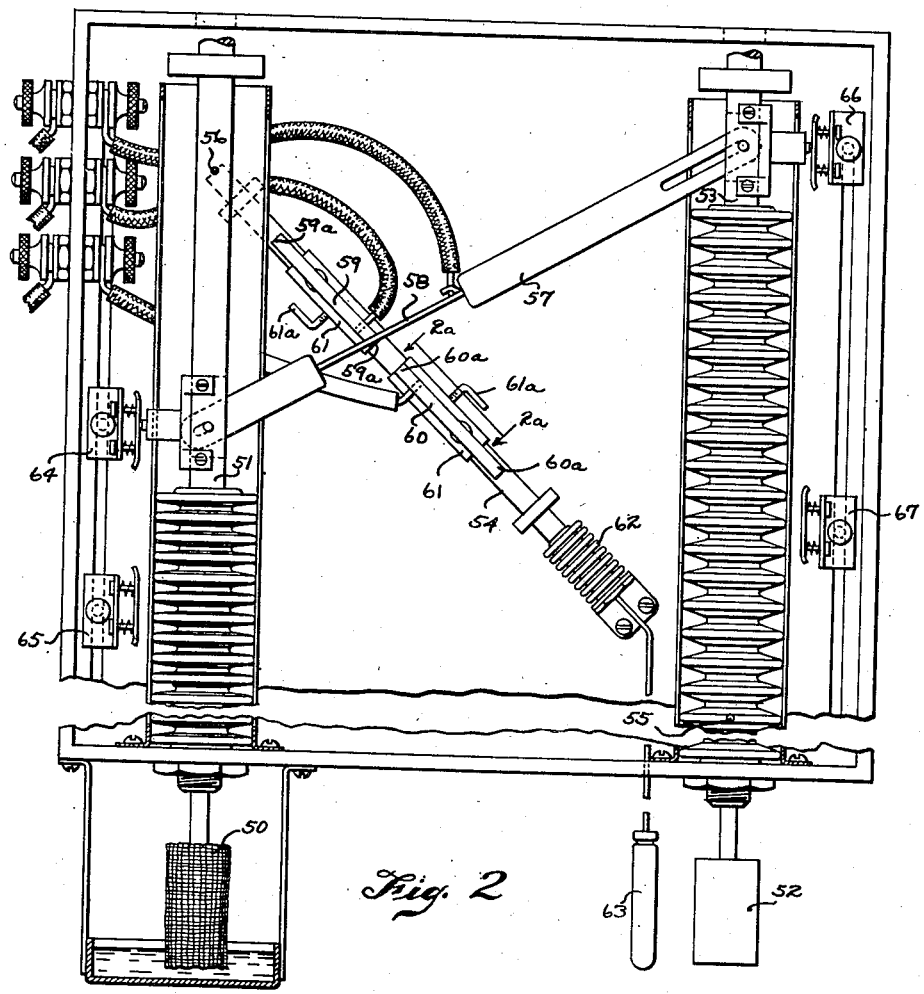
Fig. 2 is a plan view, somewhat diagrammatic, of a control adapted to control the functions of air conditioning apparatus in accordance with the effective temperature, and, if desired, also the dry bulb or wet bulb temperatures or both.
Figure 2A:
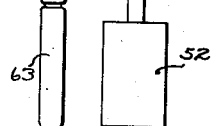
Fig. 2a is a cross sectional view taken along the line 2a—2a of Fig. 2.

In air conditioning, as applied for human comfort, the usual methods of controlling the temperature and humidity of the air in dwellings and places of human occupancy, has been such as to maintain in an enclosure, air of a definite fixed temperature and humidity. Recent investigations on the conditions of air necessary for human comfort, indicate that such a method of controlling is undesirable. It is now well known that the desirable condition for human comfort in a dwelling, or any other place of human occupancy, is to maintain the air at an effective temperature, which varies with the outside temperature.

By an effective temperature, I mean, as is usual in this art, the combination of state of humidity and temperature as given by the well known table, such as those published by the American Society of Heating and Ventilating Engineers, it being a characteristic feature of the effective temperatures as defined by the relation of temperature and humidity as given in this table, that the effective temperature measures the sensation of hotness or coldness, relative to the human body by the average observer.

The relationships between the wet bulb, dry bulb and effective temperatures have been more fully described in my copending application for refrigeration Serial No. 639,117 and will be more fully discussed with reference to Figs. 1 and 2 hereafter.

In general therefore, it is desirable in the control of the temperatures and humidities used in air conditioning, to maintain neither a constant temperature nor a constant humidity but to maintain the relationship between temperature and humidity, such that the space of occupancy is kept at a constant effective temperature.

It has been in the past, impossible to accomplish this in any automatic manner because of the lack of any control apparatus respondent to that combination of conditions of temperature and humidity which constitute effective temperatures.

In the invention as herein specified, I accomplish the control of the temperature and humidity of the air in such a way as to maintain the desirable relationship between temperature and humidity, which corresponds to maintaining the air at a constant effective temperature.

In general, the means which I employ to this end are the coupling together of a temperature respondent device and a device respondent to the relative humidity or to any property of the air which is determined by the relative humidity of the air, either independent of the absolute temperature of the air or as related to the absolute temperature of the air. For example, I may employ in place of a device responsive to the relative humidity; a device responsive to the wet bulb temperature of the air; a device responsive to the dew point of the air. Various means may be employed under this invention of say, connecting the two devices—one responsive to the temperature of the air and the other responsive directly or indirectly to the humidity of the air in such a way that the joined induction of these two devices will indicate the effective temperature of the air.

Figure 1:
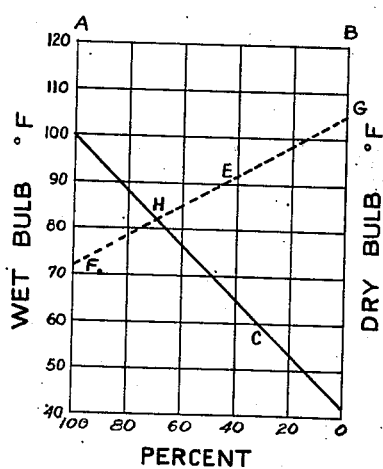
Fig. 1 is a chart indicating the relationship between dry bulb, wet bulb and effective temperatures.

I am well aware of the fact that the relationship between temperature and humidity, defining the effective temperature, is not the same at different effective temperatures, but for the purpose of conditioning air for comfort, the desirable region of effective temperature resides around the effective temperatures of about from 65° to 75°, and in this region of effective temperature, the relationship between temperature and humidity, for example as indicated in Fig. 1, is essentially linear and of constant slope. This fact makes is possible, by restricting the application of the device to this region and neighboring regions to so couple the device that a motion of the temperature sensitive element, taken in conjunction with a motion of an element whose motion is linearly proportional to the relative humidity, may be coupled in such a way as to produce an element, whose motion will be proportional to the effective temperature. This element being used to actuate a device, whereby directly or indirectly, the condition of the air may be controlled so as to maintain essentially constant effective temperature of this air. Or under this invention, any device respondent to effective temperature may be used to control the temperature and humidity of the air in such relation that their effective temperature remains constant.

As is described in my copending application for Refrigeration, Serial No. 639,117, filed October 22, 1932, while it is, in general, necessary for comfort to maintain the effective temperature at a predetermined value, it is desirable in places in which persons are entering or leaving to vary the effective temperature desired in accordance with the outside temperature and for that reason it is desirable in any means controlling air conditioning apparatus to provide means of varying the control temperature in accordance with the external temperature as well as the effective temperature.

In the description I will first describe means of maintaining an effective temperature, it being understood that the effective temperature desired will depend also on the outside temperature.

The various means known in the art for conditioning air differ in the manner in which a desirable condition of temperature and humidity are maintained. In the usual means of producing cold and dry air, as employed in the art, it is usual to contact that air with a cold fluid, which at the same time cools the air and dries it. The relation of temperature and humidity of the air as so conditioned, is fixed by the relation of aqueous tension to temperature of the contacting liquid.

With the apparatus employing this means of conditioning air, it is not most desirable to control the humidity in such a way as to keep a constant humidity or to control temperature in such a way as to keep the constant temperature, but it is desirable to control the temperature of the cooling medium or the concentration of the cooling medium if the medium is an aqueous solution in such a way that the resultant air will have a controlled effective temperature.

I accomplish this by introducing into the air, whose effective temperature it is desirable to maintain constant, a device such as described above, responsive to effective temperature, the controls on such device actuating a means for controlling either the quantity of the contacting liquid exposed; the quantity of air placed in contact with the liquid, the temperature of the liquid placed in contact with the air, or the concentration of the liquid, if the liquid is a solution.

In other means of conditioning air for comfort, as known in the art, the air is cooled out of contact with a liquid to such a temperature that a portion of the moisture in the air is precipitated on the cold surface exposed to the air. When this means of air conditioning is employed, it is desirable to maintain the effective temperature at a predetermined value. I do this by putting in contact with the air a device responsive to the effective temperature of the air, such a device actuating a valve or switch or other means controlling either the temperature of the cooled surface in contact with the air, the quantity of air passed over a said surface or the amount of surface exposed to the air.

Another class of devices for conditioning air, known to the art, separate the process of drying the air and cooling the air, so that by changing the devices governing the drying and cooling, it is possible to independently control the humidity of the air or the temperature of the air.

According to my invention, the air may be brought and maintained at a desired effective temperature, either by controlling the temperature of the air or by controlling the humidity, or the relation of the temperature to humidity may be kept at any desirable relation by suitable inter-connection between the valves or other devices controlling the amount of drying accomplished and the valves or other devices controlling the temperature of the air.

Having specified my invention in general, I proceed to describe more in detail one embodiment of the invention, it being understood that any other embodiments falling within the scope of the invention may be used in place of those herein described.

In Fig. 1 the line B is a scale indicating dry bulb temperature, the line A is a scale indicating wet bulb temperature and the line C is a scale indicating effective temperature. In all of these scales, the numerical values are equal vertically, that is, all points on these scales which are equally distant vertically from a common horizontal base line have the same numerical values. Thus, if a wet bulb thermometer is placed adjacent the line A and a dry bulb thermometer adjacent the line B of proper calibration so that each thermometer indicates correctly on its corresponding scale, these thermometers would indicate the same numerical temperature only when air has 100% relative humidity. The line C is so constructed that it intersects the line B at approximately the 42° F. point and intersects the line A at approximately the 100° F. point, the line C being, for the purpose of this invention, a straight line between these two points. In order to indicate the effective temperature prevailing at any particular time, it is only necessary to construct a variable line E starting from the point F which corresponds to the indicated wet bulb temperature and extending to the point G which corresponds to the indicated dry bulb temperature. The intersection of the line E with the line C at the point H gives the effective temperature prevailing in the atmosphere being investigated. Thus the line E is a variable line which follows the dry bulb temperature at one end and the wet temperature at the other end, and indicates, at its intersection with the line C at the point H the effective temperature.

Fig. 2 shows a device more fully described in my copending application for Refrigeration, Serial No. 639,117, by which it is possible to control the effective temperature of a space either to a constant value or to a value which depends on the outside temperature and at the same time control either the wet bulb or dry bulb temperature of the air conditioned by the system.

The device shown in Fig. 2 is constructed with a definite relation to the chart shown in Fig. 1.

Thus, a wet bulb 50 is provided to create a linear motion on the shaft 51 corresponding to the wet bulb temperatures indicated on the line A of Fig. 1. The dry bulb 52 is constructed to create a linear motion on the shaft 53 corresponding to the dry bulb temperatures of line B, Fig. 1. Scale 54 is placed on the device so as to correspond to line C of Fig. 1. The point 55 corresponds to the point occupied by the indicator on shaft 53 when the dry bulb temperature is 42° and the point 56 corresponds to the point occupied by the indicator on shaft 51 when the wet bulb temperature is 100°. A lever 57 is freely pivoted on the shafts 51 and 53 to produce a line corresponding to the line E of Fig. 1, so that the controlling edge 58 of the lever 57 indicates on the scale 54 the effective temperatures corresponding to the point H of Fig. 1. If desired, upwardly resilient contacts or controls 59 and 60 having sloping ends 59a and 60a are placed on the scale 54 to operate various air conditioning apparatus in a manner hereafter more fully described, and these points 59 and 60 may be mounted on carriages 61 adjustably sliding on the scale 54 and held in adjusted position by thumb screws 61a, so that the carriages 61 may be manually set at any desired point to vary the position of the contacts 59 and 60, or the carriages may be operated by a bellows 62 connected to a thermostatic bulb 63 placed outside of the building, so that the contacts 59 and 60 may be adjusted in accordance with outside temperatures. The contacts 59 and 60 permit the edge 58 to pass over them, but maintain electrical contact as long as the edge 58 is over them. In addition, other contacts such as 64 and 65 may be placed in the path of movement of the shaft 51, these contacts controlling portions of the air conditioning apparatus in accordance with wet bulb temperatures; and other contacts 66 and 67 may be placed in the path of shaft 53 to control portions of air conditioning apparatus in accordance with dry bulb temperatures. The contacts 64, 65, 66 and 67 are mounted in slots as shown in Fig. 2 so that their position relative to the cooperating contacts may be adjusted.

Many systems of air conditioning are equally applicable to heating systems alone and to systems which jointly heat and cool. As applied to heating systems, I may either control the temperature of the heating means or the amount of the heating means, this means being either steam, hot air, or hot water, as is usually used in the art; or I can jointly control the effective temperature of the space and at the same time keep the humidity at a predetermined value by so connecting the etostat that as the effective temperature falls below a certain value, the amount of the heating means is increased, while if it falls above a certain value, the amount of the heating means is decreased.

Figure 3:
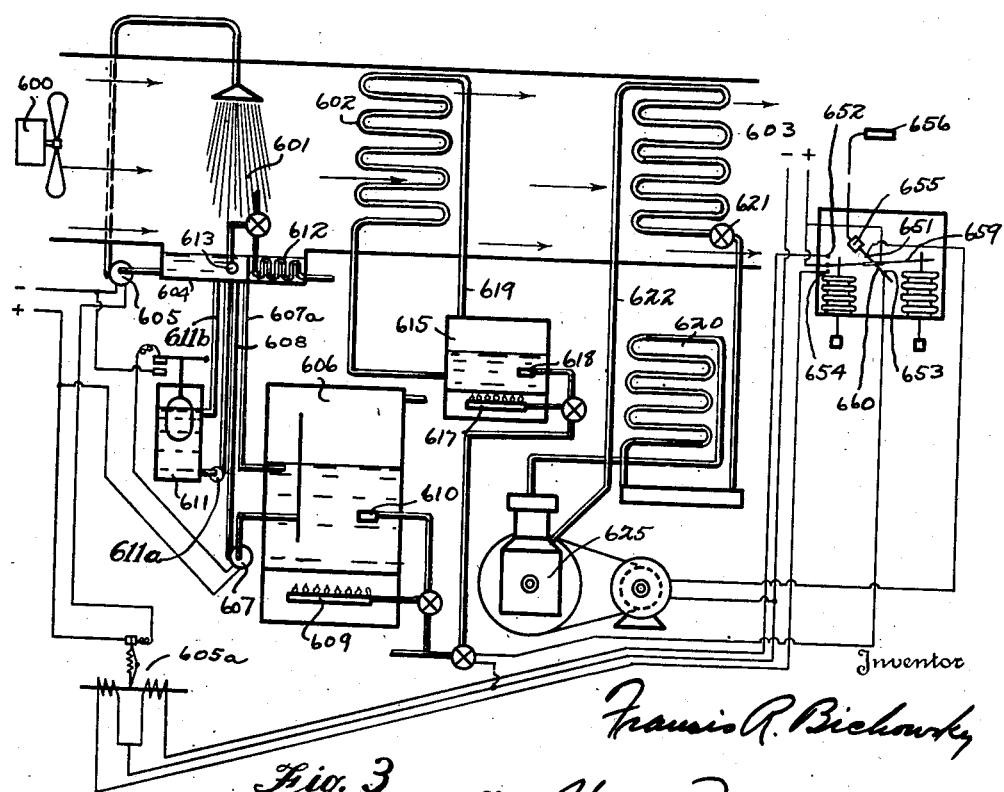
Fig. 3 is a diagrammatic showing of an apparatus in which the control is effective on heating, cooling and relative humidity modifying functions of the apparatus and in which the control mechanism is responsive to effective temperatures, wet bulb temperatures and outside temperature conditions.

In the case that the air conditioning system is applicable to summer and winter conditions I can arrange the connection to the etostat in such a way that if the effective temperature falls below a certain value, the heating means is turned on and the cooling means turned off, while if it rises above a certain value, the cooling means is turned on and the heating means is turned off; or more conveniently, since there is usually a range of temperatures and humidities where it is neither desirable to heat or to cool, I may modify the etostat, as shown in Fig. 3, by providing separate contacts 651, 652, for turning on the cooling means and the means for dehumidification and separate contacts 653, 654, for turning on the means for heating. The contact which operates the cooling means in accordance with the effective temperature may be conveniently made variable in accordance with the external temperature by means of the bellows 655 and bulb 656. It will not, in general, be advisable to make the contact 653 variable with the external temperature since experience shows that under winter conditions, that is, under conditions in which the external temperature is below 70° F., it is not desirable to vary the effective temperature of the enclosure in accordance with the external conditions.

A specific application of this control is as follows: The air to be conditioned is forced to and from the compartment in which the control is placed by means of a fan 600. The air thus passing may be subjected to the action of a spray 601, the heating means 602 and/or the cooling means 603. The contacts 652 and 654 operate on the spray means 601. Preferably, the spray means 601 is provided with a means for maintaining the hygroscopic liquid at a predetermined water vapor tension and a predetermined temperature. For this purpose a sump 604 is provided to receive the spray. Liquid is circulated to and from this sump to the spray by means of the pump 605. The liquid is concentrated, if water is being removed from the air, by means of the regenerator 606. Liquid overflows to the regenerator through the pipe 607a and is forced back by the pump 607 and returns in a concentrated condition through the line 608. The burner 609 is controlled by means of the thermostat 610 to maintain the density (or boiling point) constant. The operation of the pump 607 is controlled by a densitometer 611 to and from which liquid is circulated from the sump 604, for example by the pump 611a and lines 611b which densitometer causes the pump 607 to operate when the density falls below a predetermined value and to stop operation when the density rises above a certain value. The temperature of the liquid in the sump 604 is controlled by the heater, or cooler 612, the temperature being controlled by means of a thermostat 613 which controls the flow of fluid through the heater or cooler 612. By this construction, it is assured that liquid of a desired temperature and water vapor tension is delivered at the spray 601, and this liquid can be chosen to impart to the air any desired relative humidity.

The air being circulated by the fan 600 may be either heated or cooled in accordance with the action of the control device. Thus, the heating means 602 may be the radiator of a hot water or steam system which includes a boiler 615 heated by means of a burner 617. In turn it is controlled by means of the thermostat 618 placed either in the boiler or in the pipes of the heating system. The hot water or steam rises through the pipe 619 and descends through the radiator 602 back into the boiler 615. The air may be cooled by the action of the cooling means 603, and this cooling means 603 may be the evaporator of a refrigerating system which may include a compressor 625, a condenser 620 and an expansion valve 621. The compressed refrigerant leaving the compressor 625 is condensed in the condenser 620 and has its pressure reduced in the expansion valve 621 from whence the low pressure refrigerant flows and is evaporated in the evaporator 603, returning by means of the line 622 to be recompressed in the compressor 625.

The various portions of the air conditioning apparatus heretofore described in Fig. 3 may be controlled as follows: When the lever 659 rises to the contact (or contact zone) 652 this indicates that the relative humidity has risen to as high a degree as is desired and therefore the contact or contact zone 652 operates to start or stop the pump 605 by means of the relay 605a, depending on whether the liquid in spray 601 is a drying or moistening liquid. When the lever 659 drops to the contact (or contact zone) 654, the pump 605 starts or stops depending on the character of the liquid, since this position of the lever 659 indicates that the relative humidity has fallen to the minimum desired degree. When the lever 659 rises to the contact (or contact zone) 651, this indicates that the effective temperature has risen to the point where it is desirable to cool the air and thus the operation of the compressor 625 is started and continues so long as the lever 659 is in contact with the contact or contact zone 651. When the lever 659 descends to the contact (or contact zone) 653, this indicates that the effective temperature has fallen to the lowest desired degree and that the air should be heated. Thus, under this condition the burner 617 is caused to operate and supply heat to the radiator 602. Under ordinary conditions, in the summer time, it is desirable to provide cooling means when the effective temperature is above 75° and thus the lever 659 may be so calibrated that it reaches the zone 651 when the effective temperature reaches 75° and will continue to remain in contact therewith so long as the temperature is above 75°. Likewise, the apparatus may be so calibrated that when the lever 659 falls to the zone 653, the effective temperature has fallen to 65° and at this point it is desirable to heat the air and thus the lever is caused to remain in contact with the point 653 so long as the effective temperature is below 65°. In addition, the contact points or zones 651 and 653 may be mounted on an adjustable carriage 660 (or individually adjustable carriages for each zone 651 and 653) which is movable in response to outside temperature conditions by means of the bellows 655 connected to the outside thermostatic bulb 656. If desired, in lieu of the contacts 652 and 654, a similar contact may be used at the other side, which contact may be opened and closed in accordance with dry bulb temperatures instead of wet bulb temperatures, the action being similar to that of contacts 66 and 67 of Fig. 2.

While the form of embodiment of the present invention as herein disclosed, constitutes a preferred form, it is to be understood that other forms might be adopted, all coming within the scope of the claims which follow.

What is claimed is as follows:

1. An apparatus for conditioning air in an enclosure, comprising a cooling coil adapted to have fluid flowing therein in contact with the air, a device responsive to effective temperatures and including a wet bulb thermometer, means for controlling the flow through said coil with said device in accordance with effective temperatures in said enclosure, means for contacting the air with a hygroscopic liquid, and means for controlling the contact of said liquid by said wet bulb thermometer.

2. An apparatus for conditioning air in an enclosure, comprising a cooling coil in contact with the air, a device responsive to effective temperatures and including a wet bulb thermometer, means for controlling said cooling coil with said device in accordance with effective temperatures in said enclosure, means for contacting the air with a hygroscopic liquid, means for maintaining said liquid at a predetermined temperature, and means for controlling said contacting means by said wet bulb thermometer.

3. In an air conditioning system for an enclosure, means responsive to one function of the effective temperature of air, means responsive to another function of the effective temperature of air, means responsive to the joint action of the aforesaid means for maintaining the effective temperature within a predetermined range, and means responsive to said first named means for independently controlling one function of the effective temperature condition of the air.

4. An apparatus for conditioning air in an enclosure, comprising a cooling coil adapted to have fluid flowing therein in contact with the air, a device responsive to effective temperatures and including a wet bulb thermometer, means for controlling the flow through said coil with said device in accordance with effective temperatures in said enclosure, means for contacting the air with a hygroscopic liquid, and means for controlling the contact of said liquid by said wet bulb thermometer.

5. An apparatus for conditioning air in an enclosure comprising means for varying the absolute humidity of air, means for changing the temperature of air, a device for controlling the operation of one of said means in accordance with the effective temperature of the air in said enclosure, a bulb temperature responsive device responsive to the wet bulb temperature in said enclosure, a bulb temperature responsive device responsive to the dry bulb temperature in said enclosure, one of said bulb temperature responsive devices controlling the other of said means and the other of said bulb temperature devices forming part of said first named device.

6. In combination with air conditioning apparatus for an enclosure, control mechanism for said apparatus for maintaining the effective temperature in said enclosure within a predetermined comfort zone, said control mechanism comprising means responsive to one function of the effective temperature of air, means responsive to another function of the effective temperature of air, means responsive to the joint action of the aforesaid means for controlling said apparatus in accordance with the effective temperature, and means responsive to one of said functions for controlling said function for limiting said effective temperature within said comfort zone.

FRANCIS R. BICHOWSKY.